(12) United States Patent
Runcie et al.

(10) Patent No.: US 9,582,304 B2
(45) Date of Patent: *Feb. 28, 2017

(54) REMOTE MANAGEMENT OF VIRTUAL MACHINES HOSTED IN A PRIVATE NETWORK

(71) Applicant: KASEYA INTERNATIONAL LIMITED, St. Helier (JE)

(72) Inventors: George Runcie, Santa Barbara, CA (US); Derek Rodrigues, Ojai, CA (US)

(73) Assignee: KASEYA INTERNATIONAL LIMITED, Dublin (IE)

(*) Notice: Subject to any disclaimer, the term of this patent is extended or adjusted under 35 U.S.C. 154(b) by 200 days.

This patent is subject to a terminal disclaimer.

(21) Appl. No.: 14/501,301

(22) Filed: Sep. 30, 2014

(65) Prior Publication Data

US 2015/0135180 A1    May 14, 2015

Related U.S. Application Data

(63) Continuation of application No. 13/855,948, filed on Apr. 3, 2013, now Pat. No. 8,849,906, which is a continuation of application No. 12/469,171, filed on May 20, 2009, now Pat. No. 8,438,216.

(51) Int. Cl.
*G06F 9/455* (2006.01)
*H04L 29/06* (2006.01)

(52) U.S. Cl.
CPC ........... *G06F 9/45533* (2013.01); *G06F 9/455* (2013.01); *H04L 63/0272* (2013.01)

(58) Field of Classification Search
CPC ... H04L 63/0272; G06F 9/45533; G06F 9/455
See application file for complete search history.

(56) References Cited

U.S. PATENT DOCUMENTS

| | | | | |
|---|---|---|---|---|
| 7,278,157 B2* | 10/2007 | Jones | ..................... | H04L 63/029 726/12 |
| 7,840,673 B1* | 11/2010 | O'Crowley | ......... | H04L 67/1002 709/201 |
| 8,230,050 B1* | 7/2012 | Brandwine | ........... | H04L 45/586 709/220 |
| 2008/0178278 A1* | 7/2008 | Grinstein | ............ | H04L 63/0227 726/12 |
| 2009/0144393 A1* | 6/2009 | Kudo | ..................... | G06F 9/5044 709/218 |
| 2010/0138830 A1* | 6/2010 | Astete | ................. | G06F 9/45533 718/1 |
| 2010/0217843 A1* | 8/2010 | Dehaan | ..................... | G06F 8/65 709/221 |

* cited by examiner

*Primary Examiner* — Abdullahi E Salad

(57) ABSTRACT

Management of virtual machines within a private network may be provided from a server application, such as a web application, on a machine remote from a private network. The server application receives management commands and communications the management commands in a vendor independent format to a client application within the private network. The client application receives the management commands, instantiates the management commands into a vendor specific definition and redirects the management commands to the virtual machine host for appropriate execution.

20 Claims, 4 Drawing Sheets

REMOTE MANAGEMENT OF VIRTUAL MACHINES HOSTED IN A PRIVATE NETWORK

CROSS-REFERENCE TO RELATED APPLICATION

The instant application is a continuation of and claims priority from patent application Ser. No. 13/855,948, filed Apr. 3, 2013, entitled REMOTE MANAGEMENT OF VIRTUAL MACHINES HOSTED IN A PRIVATE NETWORK, now issued U.S. Pat. No. 8,849,906, issued on Sep. 30, 2014, which is a continuation of application Ser. No. 12/469,171, filed May 20, 2009, entitled REMOTE MANAGEMENT OF VIRTUAL MACHINES HOSTED IN A PRIVATE NETWORK, now issued U.S. Pat. No. 8,438,216, issued on May 7, 2013, the entire contents of each are incorporated by reference herein.

FIELD OF THE INVENTION

This invention relates to virtual machines existing on a private network and to the remote management of the network via a virtual network host.

BACKGROUND OF THE INVENTION

Virtual machines are configured on virtual machine hosts, of which Microsoft Virtual Server, VMWare Server, VMWare ESX Server, are commercially available examples. Typically, the virtual machine host is protected within a private network by a firewall which prevents external communications from remote machines outside of the network. It is therefore difficult to remotely manage the private network from outside of the network.

What is required is a system, method and computer readable medium for remotely managing virtual machines within a private network.

SUMMARY OF THE INVENTION

In one aspect of the disclosure, there is provided a method for managing one or more virtual machines in a private network. The method comprises generating at least one virtual machine management command in a server application, communicating the at least one virtual machine management command from the server application to a client application within the private network, redirecting the at least one virtual machine management command from the client application to a virtual machine host of the private network, and executing the at least one virtual machine management command in the virtual machine host.

In one aspect of the disclosure, there is provided a system comprising a virtual machine host that resides within a private network, a client application that resides on a machine within the private network, a server application that resides on a machine remote from the private network, a communication channel from the server application to the client application for providing one or more management commands from the server application to the client application, and a redirection channel for redirecting the one or more management commands from the client application to the virtual network host.

In one aspect of the disclosure, there is provided a computer-readable medium comprising computer-executable instructions for execution by a processor, that, when executed, cause a processor to provide an interface on a remote machine to receive one or more virtual machine management commands in a host independent format, receive one or more virtual machine management commands through the interface, and communicate the one or more virtual machine management commands in a host independent format to a client application within a network.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
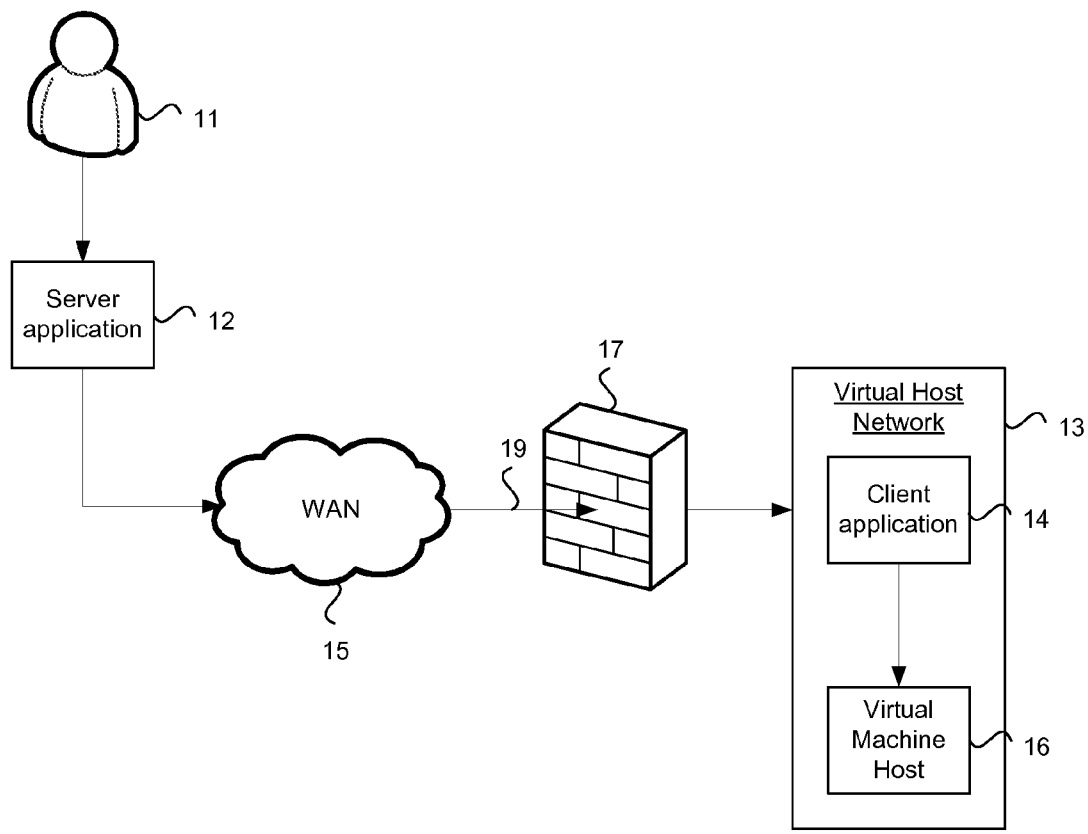
FIG. 1 illustrates a system for remotely managing virtual machines of a private network.

In FIG. 1, there is shown a system 10 in accordance with an embodiment of the disclosure. In the system 10, a private network 13 includes a virtual machine host 16 such as a vendor specific virtual machine server, of which Microsoft Virtual Server, VMWare Server, VMWare ESX Server, are commercially available examples. The private network 13 may include any number of additional physical machines (not shown) that execute any number of applications. The private network 13 may interact with a public wide area network 15 such as the internet. Protection of the private network may be provided by a firewall 17 as is known.

A server application 12 is provided on a machine remote or external to the private network 13. The server application may be provided as a web application with a suitable interface allowing the user 11 to enter network management commands and parameters. A web application may be provided from a web server (not shown) within the virtual network 13. The term remote as used herein describes that the server application is not typically configured on a machine within the machines of the private network 13. A machine on which the server application executes to receive management commands may be remote to the network by not being configured as a machine of the private network, irrespective of any geographic location of the remote machine.

Management commands may include reconfiguring virtual machine settings, e.g. drives, memory, hard disk space allocations, etc. Management commands may also include reading changed machine settings, updating power states (e.g. stopping, starting, suspending), etc. The server application 12 may be configured to receive management commands from the user 11 in a format independent of any virtual machine host vendor. In one embodiment, the management commands may be entered via a web based form, though a person skilled in the art will readily recognize other ways in which these parameters may be entered.

As described above, the virtual machine host 16 is typically provided with a firewall 17 which prevents direct communication with the virtual machine host 16 from outside of the network 13. In accordance with an embodiment of the disclosure, the virtual network 13 includes a client application 14 which provides a communication channel 19 between the server application 12 via the outside network 15 on one end and between the virtual machine host 16 on the other end.

Figure 2:
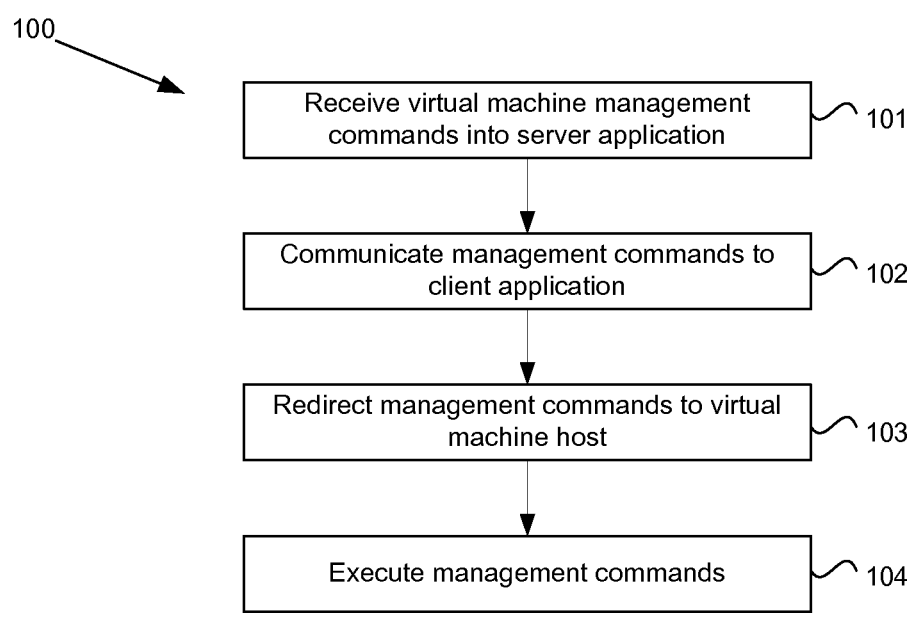
FIG. 2 illustrates a method for remotely managing virtual machines of a private network.

A method for managing one or more virtual machines in the private network 13 is illustrated in the flowchart 100 of FIG. 2. At step 101, a user provides one or more virtual machine management commands. The management commands are received by the server application and communicated to the client application 14 through the network 15 (step 102). The client application 14 redirects the management commands to the virtual machine host 16 (step 103) which then executes the management commands accordingly (step 104).

The client application may reside on any machine within the virtual network 13 including the virtual machine host 16 itself. However, the client application 14 is configured with a communication channel that allows it to communicate with outside machines through any network firewalls 17.

The virtual machine management commands are specified independent of the virtual machine vendor. Therefore, the user need not be aware of the virtual machine platform vendor. The management commands are communicated in a vendor independent format over the network and are only transformed into a vendor specific definition at the point of direct interaction with the virtual machine host 16. The virtual machine management operations (start, stop, pause, etc.) are agnostic with respect to the virtual machine host platform. When initiating these management operations from the remote server, the end-user need not know or care that a particular virtual machine is hosted by VMware ESX, Microsoft Virtual Server, etc. It is only once the management operations are executed on the host system by the client, that the generic operations are translated (by the client) into vendor specific operations.

The server application 12 downloads the client side management utilities which support an application command line interface and an event messaging interface. Utilities are downloaded to their corresponding hosts. The server application 12 will supports different virtualization platforms by providing their corresponding set of management utilities. The command and messaging interface allows the server application 12 to use a single engine to manage any virtualization platforms without specialization requirements.

In one specific example, MS Windows virtualization platforms host a light preconfigured virtual machine to provide a minimum execution environment for the downloaded utilities. This eliminates the requirement for special platform support development. For example, VMWare ESX server runs on a derived Linux OS. Having a light virtual machine running MS Windows in ESX servers can eliminate porting requirements.

Normalizing the features of the server application 12 to the highest common denominator across different virtualization platforms will require some utilities to encapsulate extra functionalities than others. For example, MS Virtual Server 2005 does not provide extensive snapshot features that VMWare ESX or MS Hyper-V support. ESX & Hyper-V provide historical snapshots whereas VS2k5 only provides a single time snapshot which means there is only one snapshot that can be restored at anytime. To enhance VS2k5 snapshot functionality, the server's VS2k5 utility will provide a mechanism to save away the VS2k5 snapshots when the snapshot command is executed from the server. The utility will create its own storage archive in the host machine to put away each snapshot while cataloging snapshot properties for later retrievals. In another example, VMWare platforms do not provide virtual machine desktop thumbnails on their virtualization management platforms. MS tools not only show the vms' desktop thumbnails, but also provide APIs to retrieve them. The server web management interface will provide desktop thumbnails for all virtualization platforms.

In a network having multiple virtual machine hosts 16, the virtual machine management commands may include a specification of which virtual machine host a virtual machine is resident on.

Figure 3:
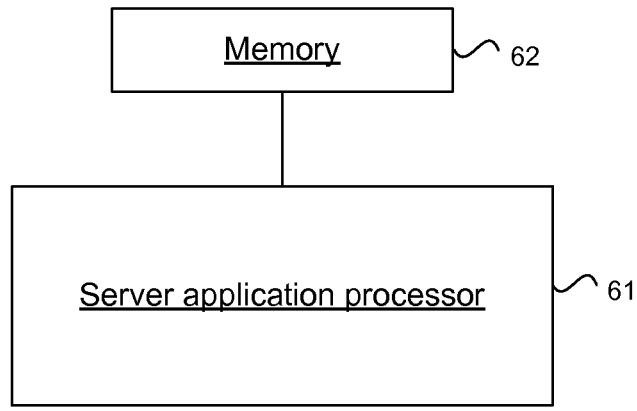
FIG. 3 illustrates a processor and memory of a remote machine that executes a server application.
Figure 4:
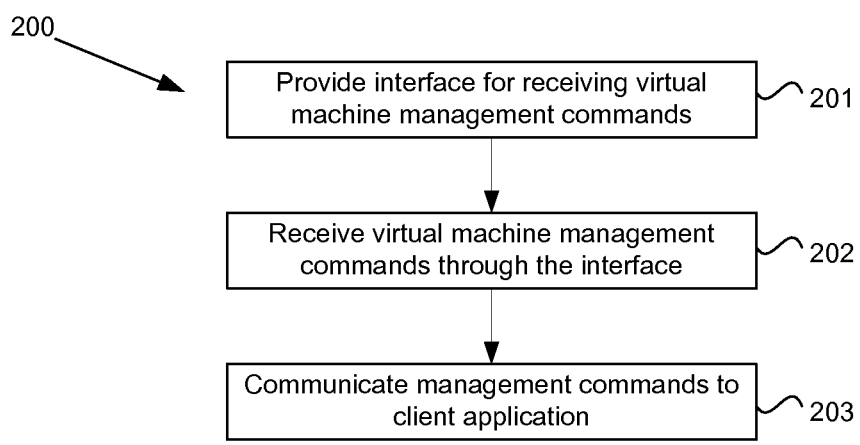
FIG. 4 illustrates an instruction set that may be executed on the processor and memory of FIG. 3.

The components of the systems 10 may be embodied in hardware, software, firmware or a combination of hardware, software and/or firmware. In a hardware embodiment, the server application 12 may be executed on a device, such as a computer, etc including a processor 61 operatively associated with a memory 62 as shown in FIG. 3. The memory 62 may store instructions that are executable on the processor 61. An instruction set 200 that may be executed on the processor 61 is depicted in the flowchart of FIG. 3. Specifically, when executed, the instruction set 200 allows the processor to provide the server application through an interface (step 201), which allows the user to enter virtual machine management commands. The management commands are recorded by the processor 61 (step 202) and communicated to the client application (step 203) in a host independent format.

Figure 5:
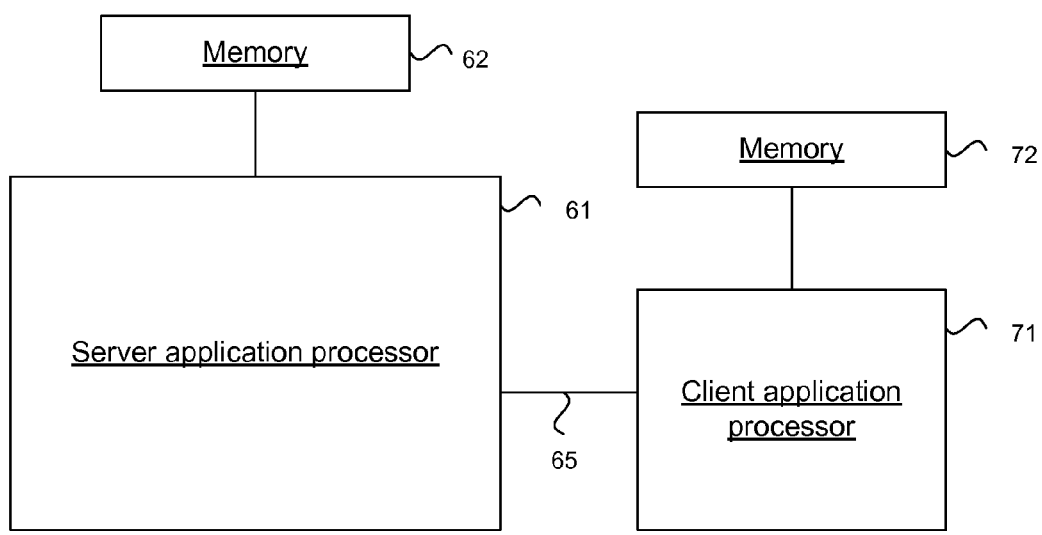
FIG. 5 illustrates the processor and memory of FIG. 3 in association with a processor and memory of a network machine that executes a client application.

As shown in FIG. 5, the processor 61 may communicate through a suitable communications link 65 with further processors, such as a processor 71 of a machine within the network 13 with associated memory 72. Through the communications link 65, the processor 61 may provide the virtual machine management commands. The processor 71 may execute the client application in order to receive the virtual machine management commands and transform the host independent management commands into a host specific definition, thereby allowing the virtual machine host to execute the management commands for the relevant virtual machine.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
communicating at least one virtual machine management command to a client application within a private network, wherein the client application is configured with a communication channel permitting communication with machines external to the private network;
redirecting the at least one virtual machine management command from the client application to a virtual machine host of the private network; and
executing the at least one virtual machine management command in the virtual machine host.

2. The method according to claim 1 wherein the client application provides an entry point into the private network.

3. The method according to claim 1 comprising executing the client application from the virtual machine host.

4. The method according to claim 1 comprising generating the at least one virtual machine management command in a server application, wherein the server application resides in a machine remote from the private network.

5. The method according to claim 4 comprising configuring the client application to provide a communication channel between the server application and the client application.

6. The method according to claim 4 comprising communicating the at least one management command from the server application to the client application in a vendor independent configuration.

7. The method according to claim 1 wherein the client application instantiates the at least one management command into a vendor specific virtual machine host format.

8. The method according to claim 4 comprising providing the server application as a web application.

9. A system, comprising:
a virtual machine host, including a processor and memory, resides within a private network;
a client application that resides on a machine within the private network;
wherein the client application receives one or more management commands, via a communication channel from a machine external to the private network, wherein the communication channel permits communication between the client application that resides on the machine within the private network and the machine external to the private network; and
a redirection channel that redirects the one or more management commands from the client application to the virtual machine host.

10. The system according to claim 9 wherein the client application is executed on a machine within the private network.

11. The system according to claim 9 wherein the client application is executed on the virtual machine host.

12. The system according to claim 9 wherein the communication channel comprises a firewall.

13. The system according to claim 9 comprising a server application that resides on the machine external to the private network, wherein the server application is configured to communicate the one or more management commands to the client application in a vendor independent format.

14. The system according to claim 12 wherein the client application is configured to instantiate the one or more management commands into a vendor specific definition.

15. The system according to claim 13 wherein the server application is configured to download one or more client side management utilities.

16. The system according to claim 9 wherein the client application supports a pre-configured virtual machine that provides a minimum execution environment.

17. A non-transitory computer-readable storage medium comprising computer-executable instructions for execution by a processor, that, when executed, cause a processor to:
receive one or more virtual machine management commands in a host independent format through an interface on a remote machine; and
communicate the one or more virtual machine management commands in a host independent format to a client application within a private network, wherein the client application is configured with a communication channel that permits communication with machines external to the private network.

18. The non-transitory computer readable storage medium according to claim 17 comprising instructions that cause the processor to perform at least one of: execute the client application that receives the one or more virtual machine management commands and redirect the one or more virtual machine management commands to a virtual machine host.

19. The non-transitory computer readable storage medium according to claim 18 wherein the client application is configured to perform at least one of:
determine a virtual machine host from the one or more virtual machine management commands; and
convert the one or more virtual machine management commands into a host dependent format.

20. The non-transitory computer readable storage medium according to claim 18 comprising instructions that cause the virtual machine host to execute the one or more virtual machine management commands.

* * * * *